(12) United States Patent
Gaultier et al.

(10) Patent No.: US 7,027,554 B2
(45) Date of Patent: Apr. 11, 2006

(54) REDUCED-SIZE APPARATUS FOR NON-INTRUSIVELY INSPECTING AN OBJECT

(75) Inventors: François R. Gaultier, Oakland, CA (US); Ugo Di Girolamo, Menlo Park, CA (US); Pierfrancesco Landolfi, Newark, CA (US)

(73) Assignee: InVision Technologies, Inc., Newark, CA (US)

( * ) Notice: Subject to any disclaimer, the term of this patent is extended or adjusted under 35 U.S.C. 154(b) by 42 days.

(21) Appl. No.: 10/791,470

(22) Filed: Mar. 1, 2004

(65) Prior Publication Data
US 2005/0190879 A1    Sep. 1, 2005

(51) Int. Cl.
*A61B 6/00* (2006.01)

(52) U.S. Cl. .......................................... 378/19; 378/57
(58) Field of Classification Search ............. 378/4–20, 378/57
See application file for complete search history.

(56) References Cited

U.S. PATENT DOCUMENTS

| | | | | |
|---|---|---|---|---|
| 4,266,136 A | * | 5/1981 | Duinker | 378/21 |
| 5,867,553 A | * | 2/1999 | Gordon et al. | 378/4 |
| 5,966,422 A | * | 10/1999 | Dafni et al. | 378/9 |
| 6,859,514 B1 | * | 2/2005 | Hoffman | 378/19 |

* cited by examiner

*Primary Examiner*—Craig E. Church
*Assistant Examiner*—Jurie Yun
(74) *Attorney, Agent, or Firm*—Blakely, Sokoloff, Taylor & Zafman; Stephen M. De Klerk (57) ABSTRACT

This invention relates to an x-ray based non-intrusive inspection apparatus. An x-ray source is mounted to a gantry and provides x-rays that transmit through an object. The x-rays have an included angle between first and second shadow lines. A circle of reconstruction is formed upon rotation of the gantry having a radius from a center axis of rotation of the gantry to a closest point on the first shadow line. The second shadow line passes through the center axis so that x-rays transmit through only half of the circle of reconstruction at any given moment. The entire volume within the circle of reconstruction is scanned due to rotation of the gantry. Such an assembly allows for the x-ray source to be placed closer to the center axis of rotation of the gantry without reducing the radius of the circle of reconstruction.

20 Claims, 10 Drawing Sheets

REDUCED-SIZE APPARATUS FOR NON-INTRUSIVELY INSPECTING AN OBJECT

BACKGROUND OF THE INVENTION

1). Field of the Invention

This invention relates to an x-ray based non-intrusive inspection apparatus and to a method of non-intrusively inspecting an object.

2). Discussion of Related Art

Inspection apparatus are commonly used for non-intrusively inspecting luggage or other closed containers before being loaded into a loading bay of an aircraft. Older generation inspection apparatus relied merely on conventional x-ray technology for non-intrusively inspecting closed containers. More recently, inspection apparatus which rely on computer tomography (CT) scanning technology have also been utilized.

An apparatus that utilizes CT scanning technology typically has a frame and a CT scanning subsystem rotatably mounted to the frame. The CT scanner subsystem has a gantry with an opening through which an object, typically luggage, can pass. An x-ray source is mounted to the gantry and radiates x-rays through the object. X-ray detectors are mounted to the gantry on an opposing side of the opening, so as to detect the x-rays after leaving the object. The x-ray source and detectors revolve together with the gantry around the object. A three-dimensional rendering of the contents of the object can be obtained by revolving the gantry and progressing the object through the x-rays.

Figure 8:
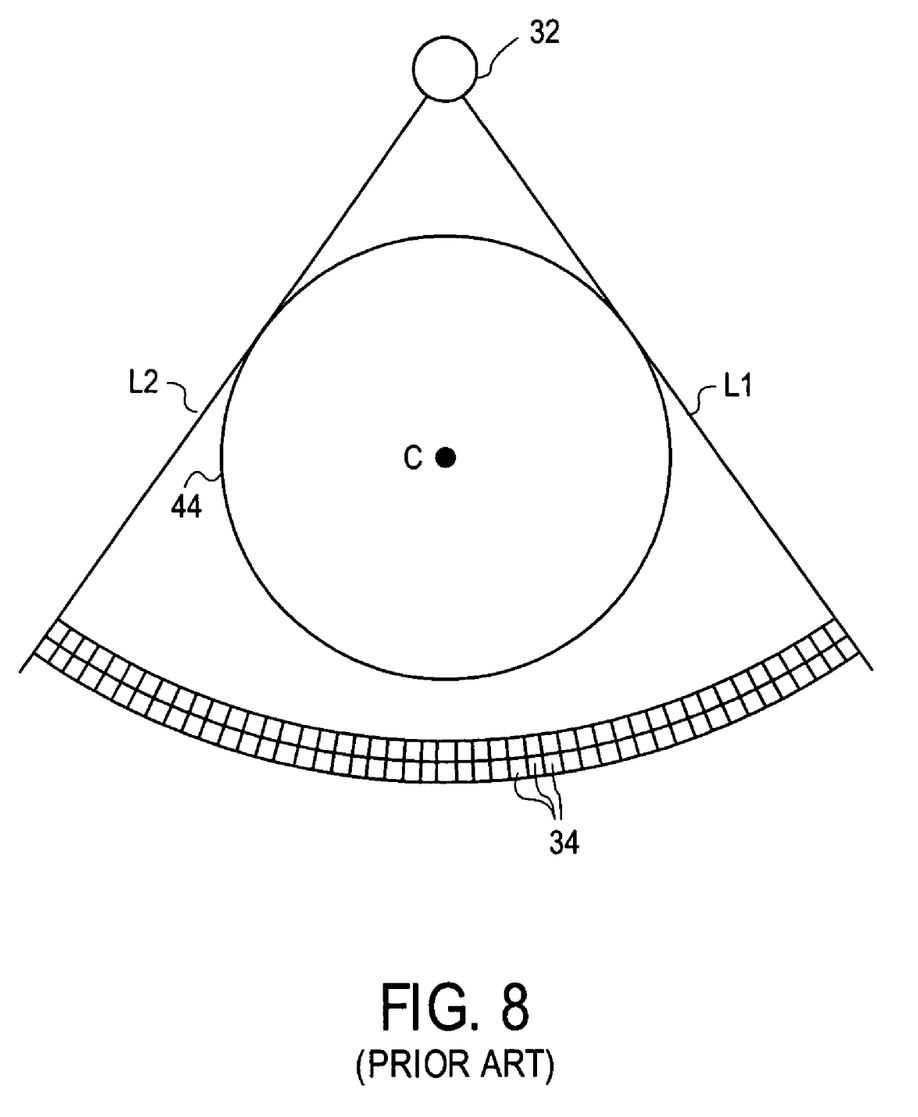
FIG. 8 is an end view illustrating a conventional x-ray based non-intrusive inspection apparatus.

FIG. 8 illustrates a conventional x-ray based non-intrusive inspection apparatus. An x-ray source 32 radiates x-rays with an included angle A of approximately 70°. Detectors 34 detect the x-rays after passing through an object. The x-ray source 32 and detectors 34 revolve about a center axis C so that an object can be inspected from different sides.

Shadow lines L1 and L2 can be constructed in space where there is a transition from x-rays to no x-rays, i.e., from detected x-rays to non-detected x-rays. The shadow lines L1 and L2 are tangential to a circle of reconstruction 44 having a center axis that coincides with the center axis C. The object being scanned should pass entirely through the circle of reconstruction 44 so that a three-dimensional representation can be obtained from any portion of the object.

The size of the circle of reconstruction 44 depends on two factors, namely the size of the included angle A, and the distance of the x-ray source 32 from the center axis C. The included angle A can only be increased to approximately 70°, whereafter there is a degradation in the quality of an object that can be resolved because (i) the heel effect of the x-ray source 32 causes degradation of the x-ray spectrum, and (ii) the focal spot seen by one of the detectors 34 becomes bigger. The x-ray source 32, accordingly, has to be placed relatively far from the center axis C to obtain a sufficiently large circle of reconstruction 44 while maintaining the included angle A less than 70°. A large distance from the center axis C to the x-ray source 32, however, results in a large gantry and support frame that may not be suitable for placement in certain confined spaces. A larger gantry also requires larger forces to accelerate and decelerate the gantry. The larger forces, in turn, necessitate the design of a larger, stronger, and heavier support frame.

SUMMARY OF THE INVENTION

The invention provides an x-ray based non-intrusive inspection apparatus which includes a support frame, an object support secured to the support frame, a gantry mounted to the support frame and being rotatable about a center axis relative to an object held by the object support, an x-ray source mounted to the gantry and providing x-rays that transmit through the object, the x-rays having an included angle between first and second shadow lines such that a circle of reconstruction is formed upon rotation of the gantry having a radius from the center axis to a closest point on the first shadow line, a distance from the center axis to a closest point on the second shadow line being less than the radius, and a plurality of detectors located in a position to detect the x-rays after leaving the object.

The included angle is preferably less than 80 degrees, more preferably less than 75 degrees.

The radius is preferably at least twice the distance, more preferably at least three times the distance.

The distance may be approximately 0 cm.

The apparatus may include a plurality of x-ray sources, each providing x-rays that transmit through the object, the x-rays from each x-ray source having an included angle between first and second shadow lines such that a circle of reconstruction is formed upon rotation of the gantry.

The object support may be a conveyor belt.

The detectors may be on a curve having a center axis at the x-ray source.

The detectors may alternatively be on a curve having a center axis that is not at the x-ray source. The detectors may, for example, be on a curve having a center axis at the center axis about which the gantry rotates.

The x-ray source may include a vacuum envelope, an electron source providing an electron beam in the vacuum envelope, and a target having a surface on which the electron beam is directed, the surface, when viewed in cross-section in a plane of the center axis, being at an angle other than normal to the electron beam so that the x-rays radiate toward the center axis.

When viewed in cross-section at right angles to the center axis, a line from a center axis of and normal to the surface preferably does not pass through the center axis.

The line is preferably located between a line passing through the center line and a line dividing the included angle in half.

The invention further provides an x-ray based non-intrusive inspection apparatus which includes a support frame, an object support secured to the support frame, a gantry mounted to the support frame and being rotatable about a center axis relative to an object held by the object support, an x-ray source mounted to the gantry and providing x-rays having an included angle between first and second shadow lines, a point on the first shadow line closest to the center axis being farther from the center axis than a point on the second shadow line closest to the center axis, and a plurality of detectors located in a position to detect the x-rays after leaving the object.

The invention also provides a method of non-intrusively inspecting an object, including emitting x-rays from an x-ray source through the object, rotating the x-ray source about a center axis relative to the object, the x-rays having an included angle between first and second shadow lines such that a circle of reconstruction is formed upon rotation of the x-ray source having a radius from the center axis to a closest point on the first shadow line, a distance from the center axis to a closest point on the second shadow line being less than the radius, and a plurality of detectors located in a position to detect the x-rays after leaving the object.

The invention also provides a method of non-intrusively inspecting an object, including emitting x-rays from an x-ray source through the object, rotating the x-ray source about a center axis relative to the object, the x-rays having an included angle between first and second shadow lines, a point on the first shadow line closest to the center axis being farther from the center axis than a point on the second shadow line closest to the center axis, and detecting the x-rays after leaving the object.

BRIEF DESCRIPTION OF THE DRAWINGS

The invention is further described by way of examples with reference to the accompanying drawings, wherein.

DETAILED DESCRIPTION OF THE INVENTION

Figure 1:
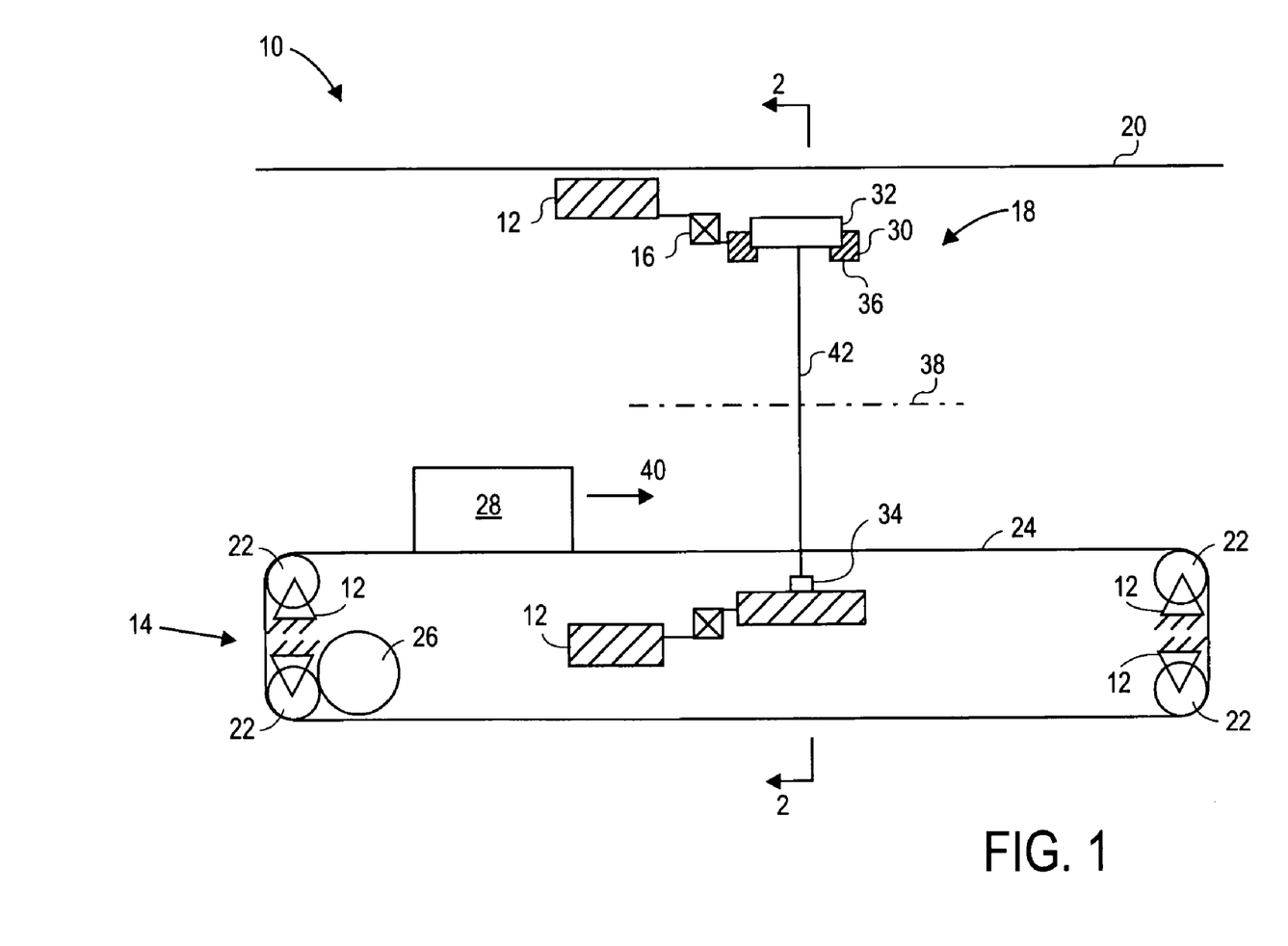
FIG. 1 is a cross-sectional side view of an x-ray based non-intrusive inspection apparatus that may include the principles of the current invention.

FIG. 1 of the accompanying drawing illustrates somewhat schematically the general construction of an x-ray based non-intrusive inspection apparatus 10 that may employ the principles of the present invention. The apparatus 10 includes a support frame 12, a conveyor system 14, a bearing 16, a CT scanner subsystem 18, and radiation shielding 20.

The conveyor system 14 includes conveyor belt rollers 22, a conveyor belt 24 and a conveyor motor 26. The conveyor belt rollers 22 are mounted at various locations to support frame 12. The conveyor belt 24 runs over the conveyor belt rollers 22 and forms a closed loop. The motor 26 is also mounted to the support frame 12. Operation of the motor 26 causes rotation of one of the conveyor belt rollers 22 to progress the conveyor belt 24. An object 28 can be placed on the conveyor belt 24 and be transported on the conveyor belt 24 from one end of the conveyor system 14 horizontally to an opposing end thereof.

The CT scanner subsystem 18 includes a gantry 30, an x-ray source 32, and a plurality of x-ray detectors 34. The gantry 30 has an opening 36 formed therein. The x-ray source 32 is mounted on one side of the gantry 30 and the detectors 34 are secured on an opposing side of the gantry 30 with the opening 36 between the x-ray source 32 and the detectors 34.

The bearing 16 has first and second circular races with a plurality of roller members between the races. The roller members maintain the races concentric relative to one another and allow for one of the races to rotate relative to the other race. One of the races is mounted to the support frame 12, and the gantry 30 is mounted to the other race. The gantry 30 is thus mounted to the frame 12, and the bearing 16 allows for rotation of the gantry 30 about a horizontal axis 38.

The conveyor belt 24 extends through the opening 36 so that the object 28 travels in a direction parallel to the horizontal axis 38 through the opening 36 in a direction 40. X-rays 42 emitted by the x-ray source 32 radiate through the object 28, leave the object 28, and are then detected by the detectors 34. By rotating the gantry 30, the x-ray source 32 and detectors 34 are rotated about the object 28 so that the x-rays 42 are transmitted from various sides about the horizontal axis 38 through the object 28. A three-dimensional rendering of the contents of the object 28 can obtained by rotating the gantry about the horizontal axis 38 and progressing the object 28 in the direction 40. The conveyor motor 26, a gantry motor (not shown) that rotates the gantry 30, feedback detectors that detect the positioning of the object 28 and the rotational positioning of the x-ray source 32, and outputs from the detectors 34 are all connected to a computer system (not shown). A program is stored on the computer system that renders the contents of the object 28 to determine whether certain shapes or densities are present. Depending on the shapes and densities that are present, the computer system can then determine whether contraband such as weapons, ammunitions, explosives, or drugs are present within the object 28.

Figure 2A:
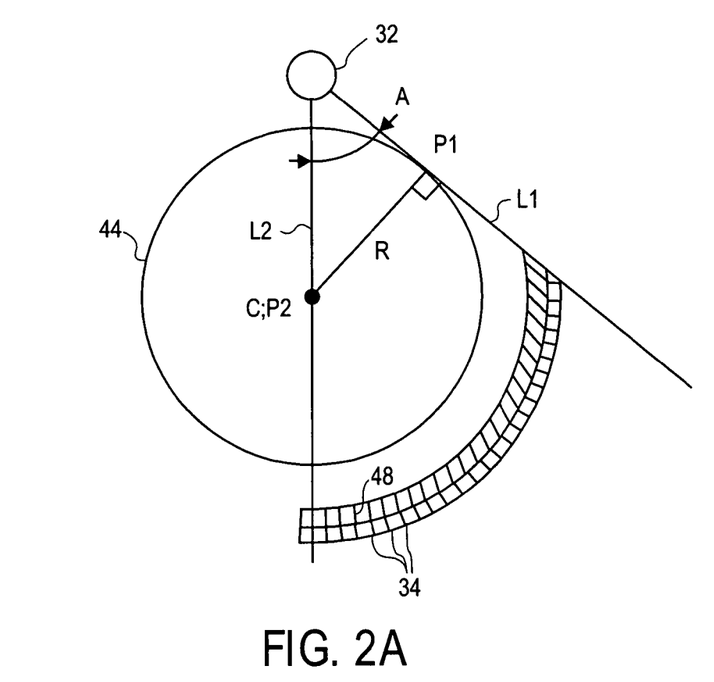
FIG. 2A is a view on 2—2 in FIG. 1 illustrating the configuration of an x-ray source to transmit x-rays through a portion only of a circle of reconstruction that is defined upon rotation of the x-ray source.

Reference is now made to FIG. 2A. The x-ray source 32 has an aperture that permits x-rays to emanate therefrom only within an included angle A from a first shadow line L1 to a second shadow line L2. The shadow lines L1 and L2 are construction lines in space indicating a transition from x-rays to no x-rays. There are thus no x-rays above and to the right of the first shadow line L1 or to the left of the second shadow line L2. The included angle A is chosen to be relatively small, in the present example 50 degrees, so that a flux of x-rays within the included angle A is relatively large. The included angle A is preferably less than 80 degrees, more preferably less than 75 degrees, more preferably less than 70 degrees for purposes of maintaining a sufficiently large flux. The gantry (reference numeral 30 in FIG. 1) rotates about a center axis C on the horizontal axis (reference numeral 38 in FIG. 1). The object (reference numeral 28 in FIG. 1) should fit entirely through a circle of reconstruction 44. This circle of reconstruction 44 has a radius R extending from the center axis C to a closest point P1 on the first shadow line L1.

Although the included angle A is relatively small, the x-ray source 32 is still placed relatively close to the center axis C by placing the x-ray source 32 relatively close to the center axis C, so that the overall size of the gantry and support frame (reference numerals 30 and 12 in FIG. 1) can, accordingly, be reduced. Such reductions allow for placement of the apparatus (reference numeral 10 in FIG. 1) in smaller spaces and for a reduction in the forces required to accelerate and decelerate the CT scanner subsystem (reference numeral 18 in FIG. 1).

By placing the x-ray source 32 closer to the center axis C1, the second shadow line L2 is not tangential to the circle of reconstruction 44. In the present embodiment, the second shadow line L2 passes through the center axis C so that x-rays pass through only one-half of the circle of reconstruction 44 at any particular moment in time. A distance from the center axis C to a closest point P2 on the second shadow line L2 is thus 0 cm. In another embodiment, it might be possible that a distance from the center axis C to the point P2 on the shadow line L2 is more than 0, so that x-rays transmit through more than 50 percent but less than 100 percent of the circle of reconstruction 44. The ratio of the radius R to the distance between the center axis and the point P2 is preferably at least two, more preferably at least three.

Although x-rays transmit through only half of the circle of reconstruction 44 at any given moment in time, the x-ray source 32 revolves about the center axis C so that, after 180 degrees of revolution, x-rays transmit through the entire circle of reconstruction 44. It has been found that a full two-dimensional rendering can be obtained by rotating the x-ray source 32 through a full 360 degrees. A three-dimensional rendering can be obtained by progressing the object on the conveyor belt (reference numerals 28 and 24 in FIG. 1).

Figure 2B:
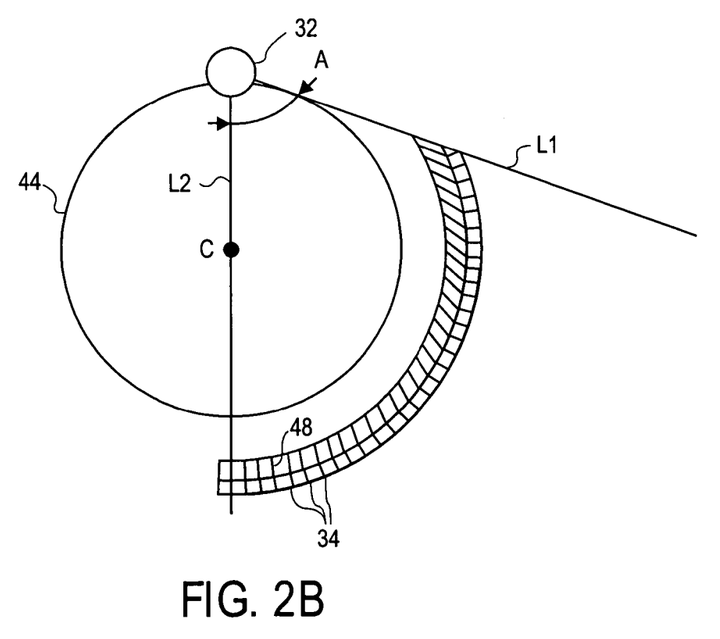
FIG. 2B is a view similar to FIG. 2A of an alternative embodiment having an x-ray source with a larger included angle of x-rays and placed closer to a center axis of a similarly sized circle of reconstruction.

In the embodiment in FIG. 2A, the detectors 34 are located on an arc having a center axis at the center axis C. Septa 48 of collimators located on the detectors 34 converge at a center axis of the x-ray source 32. FIG. 2B illustrates a similar embodiment to the embodiment illustrated in FIG. 2A, except that the x-ray source 32 has an aperture allowing for x-rays with an included angle A of 70°. The x-ray source 32 is placed even closer to the center axis C in the embodiment of FIG. 2B than in the embodiment of FIG. 2A. The arc on which the detectors 34 are located is extended when compared to the embodiment of FIG. 2A. The embodiments of FIGS. 2A and 2B are the same in all other respects.

Figure 2C:
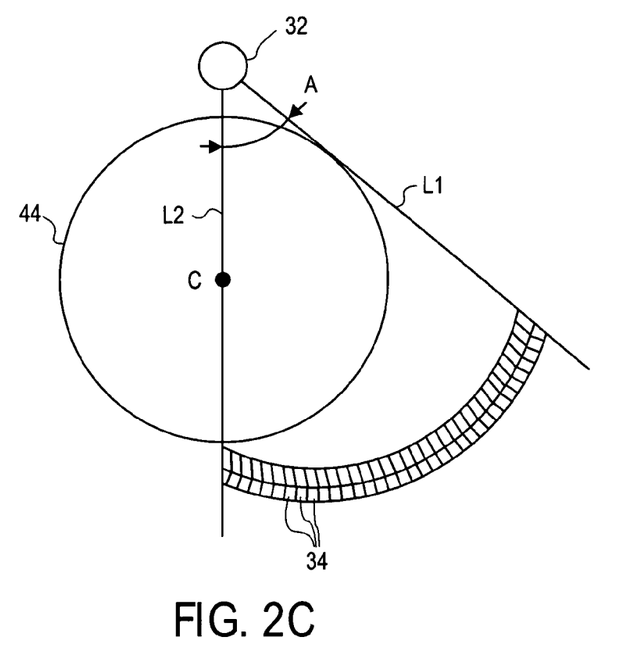
FIG. 2C is a view similar to FIG. 2A of a further embodiment having x-ray detectors on an arc not having a center axis coinciding with a center axis of a circle of reconstruction.

In the embodiments of FIGS. 2A and 2B, the effect of the non-uniform magnification from the first shadow line can be removed with an algorithm or by non-equally spacing the detectors 34. In the embodiment in FIG. 2C, the magnification is reduced by placing the detectors on an arc that does not have a center axis at the center axis C. The included angle in the embodiment of FIG. 2C is approximately 50°.

Figure 2D:
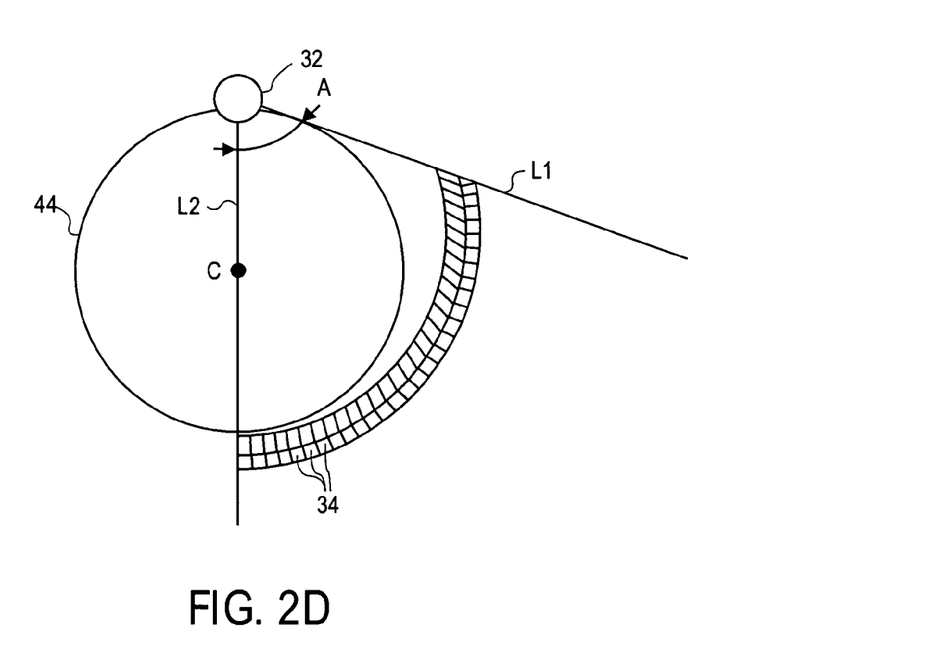
FIG. 2D is a view similar to FIG. 2C of a further embodiment having a larger included angle of x-rays.

In FIG. 2D, the included angle is approximately 70°. The detectors are on an arc that does not have a center axis at the center axis C. Because the center of the circle of the detectors is not at the radiation source 32, there is still an effect of non-uniform magnification.

Figure 3:
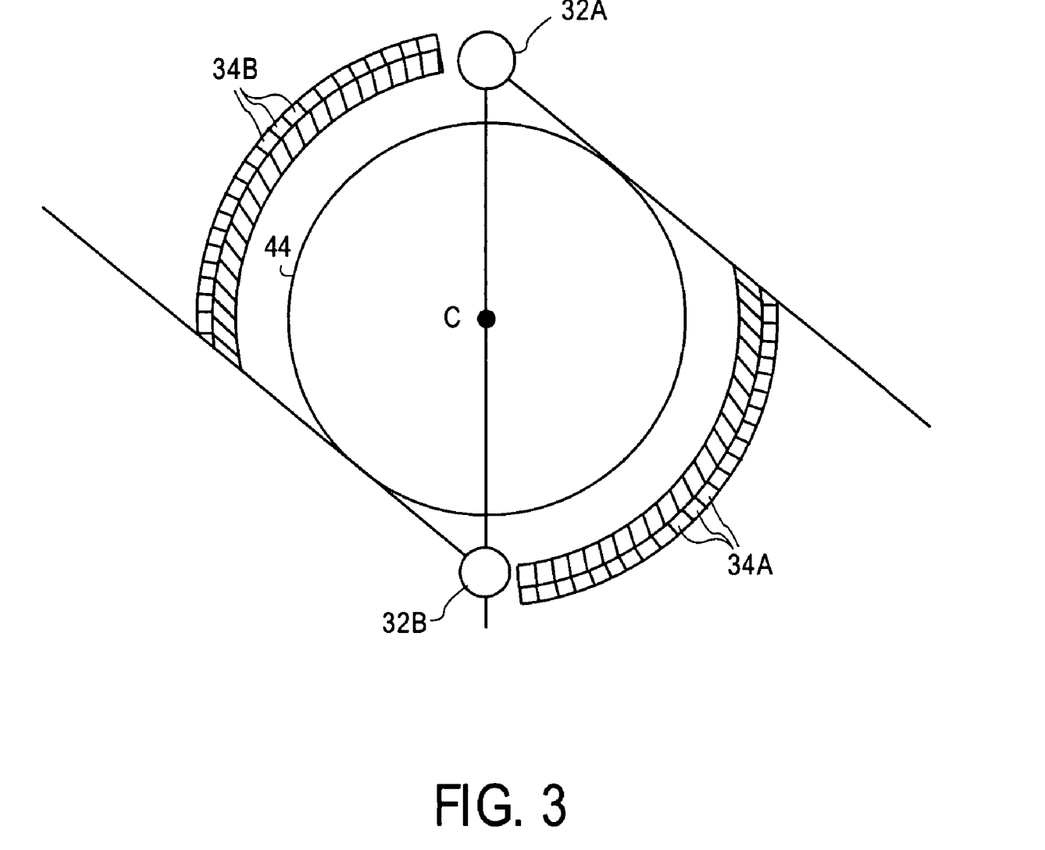
FIG. 3 is a view similar to FIG. 2A of a further embodiment having two x-ray sources and two sets of detectors.

FIG. 3 illustrates a further embodiment, having two x-ray sources 32A and 32B and two sets of detectors 34A and 34B.

The x-ray sources 32A and 32B are mounted on opposing sides of the center axis C at any given moment. X-rays from the x-ray source 32A transmit through one-half of the circle of reconstruction 44, and x-rays from the x-ray source 32B transmit through the other half of the circle of reconstruction 44. One advantage of having more than one x-ray source is that twice the data can be captured in one revolution. The x-ray sources 32A and 32B are placed at evenly spaced angles, in the present example 180°, about the center axis C for reasons relating to balancing.

The assumption has so far been made that the x-ray source 32 in FIG. 9 is moved closer in the embodiments of FIGS. 2 and 3, and that a vacuum envelope thereof is shielded in order to obtain the desired included angle A. Upon further analysis, it has been found that the target within the x-ray source 32 may have to be rotated to provide optimal resolution across the entire included angle A. A description of the x-ray source 32 is first provided, whereafter a discussion is provided of the optimal angle of the target of the x-ray source 32.

Figure 4:
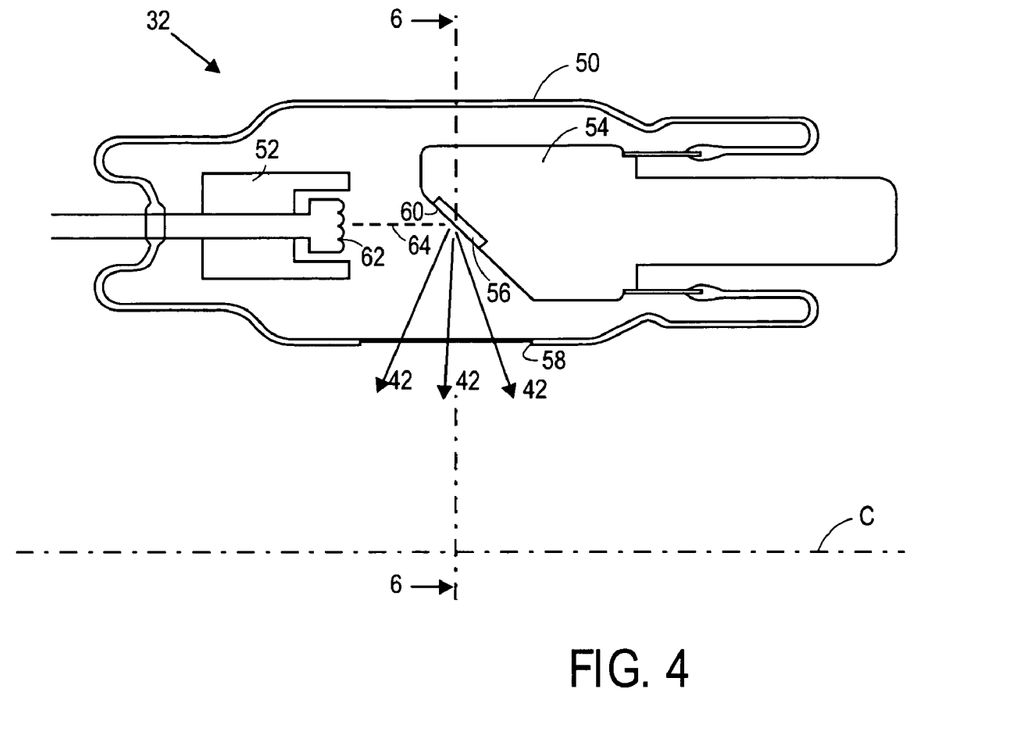
FIG. 4 is a cross-sectional side view in a plane of a center axis of the x-ray source.
Figure 5:
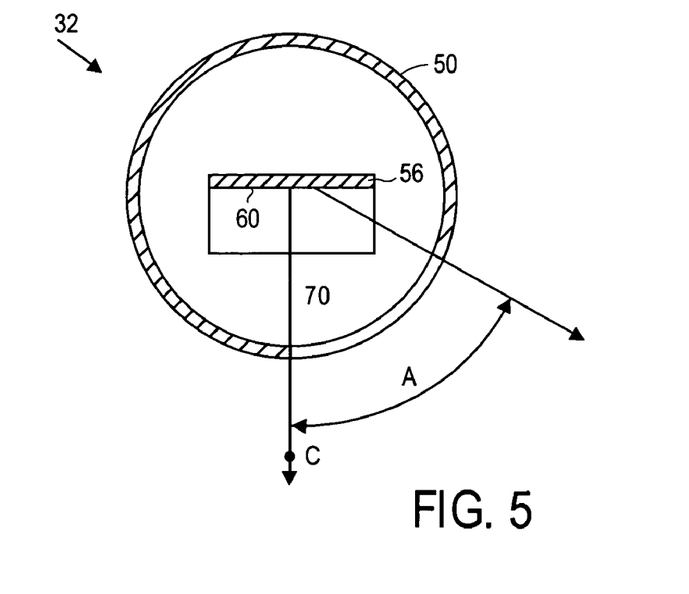
FIG. 5 is a view of the x-ray source on 6—6 in FIG. 4, i.e., at right angles to the center axis.

As illustrated in FIGS. 4 and 5, the x-ray source 32 includes a vacuum envelope 50, a cathode structure 52, an anode 54, and a target 56. The vacuum envelope 50 has a slit 58 formed therein. The cathode structure 52 and the anode 54 are both located within the vacuum envelope 50 and spaced from one another. The target 56 is located on the anode 54 and has a surface 60. In use, a current is provided to a filament 62 of the cathode structure 52, so that an electron beam 64 is provided by the filament 62. The electron beam 64 strikes the surface 60, so that the x-rays 42 are created.

Referring specifically to FIG. 4, the target 56 is at an angle other than normal to the electron beam 64. The electron beam 64 strikes the target 56 from left to right, and the x-rays 42 radiate downward through the slit 58 due to the orientation of the surface 60.

Referring now to FIG. 5, a line 70 can be drawn that is from a center point and normal to the surface 60 of the target 56. In the example illustrated, the line 70 passes through the center axis C.

Figure 7A:
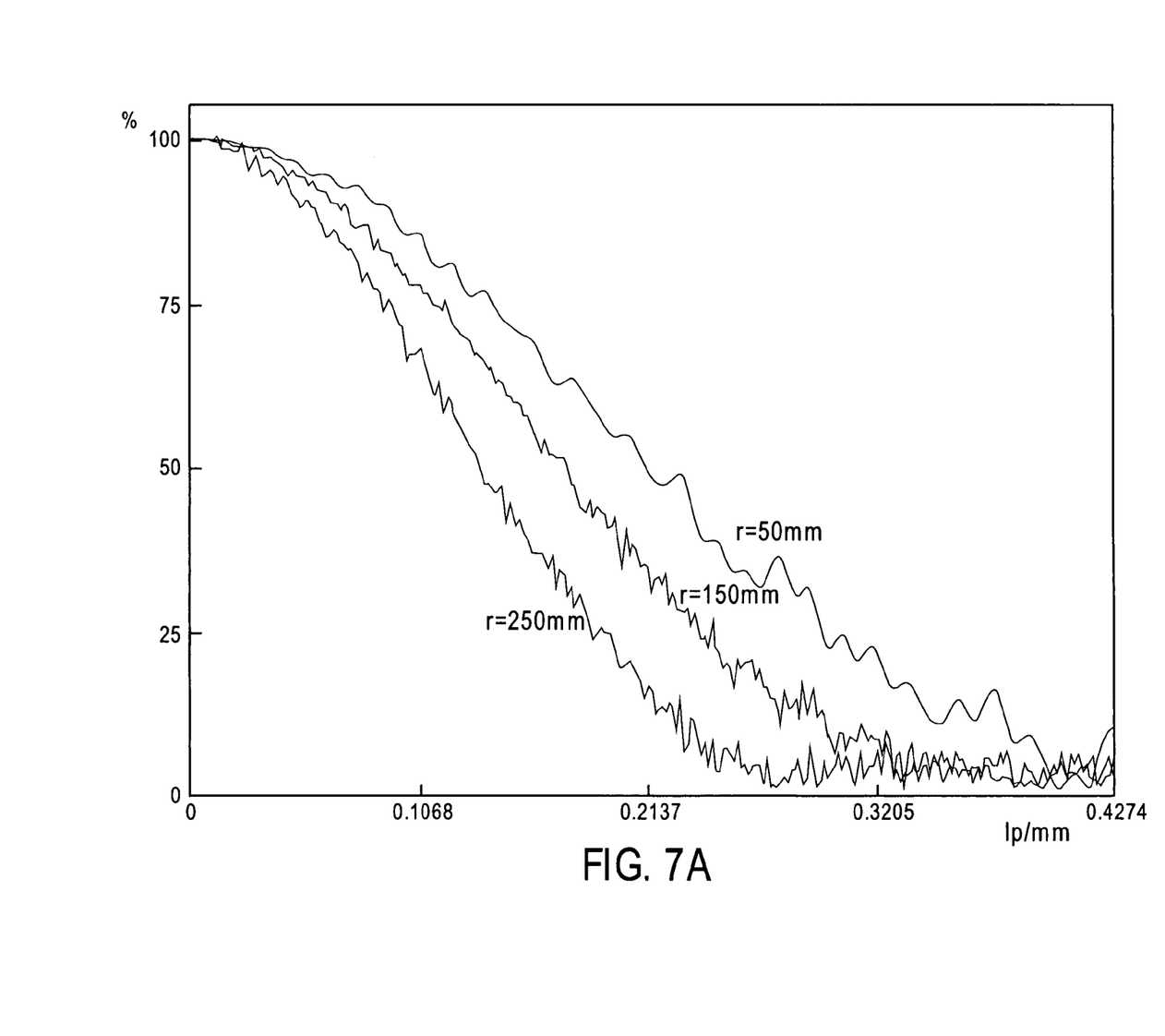
FIG. 7A is a graph illustrating the modulation transfer function of the spatial resolution of the system represented in the Fourier Domain, corresponding to FIG. 6A.
Figure 7B:
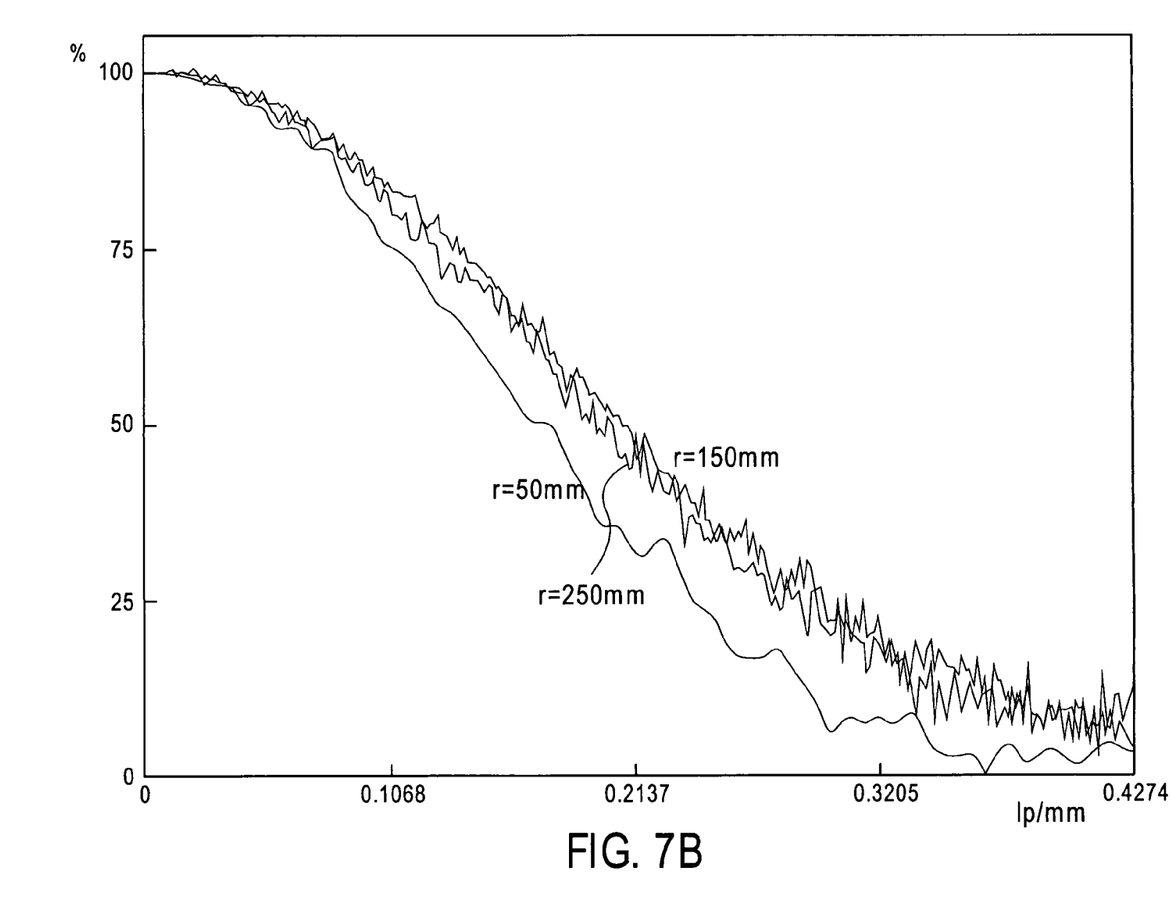
FIG. 7B is a graph illustrating the modulation transfer function of the spatial resolution of the system represented in the Fourier Domain, corresponding to FIG. 6B.
Figure 7C:
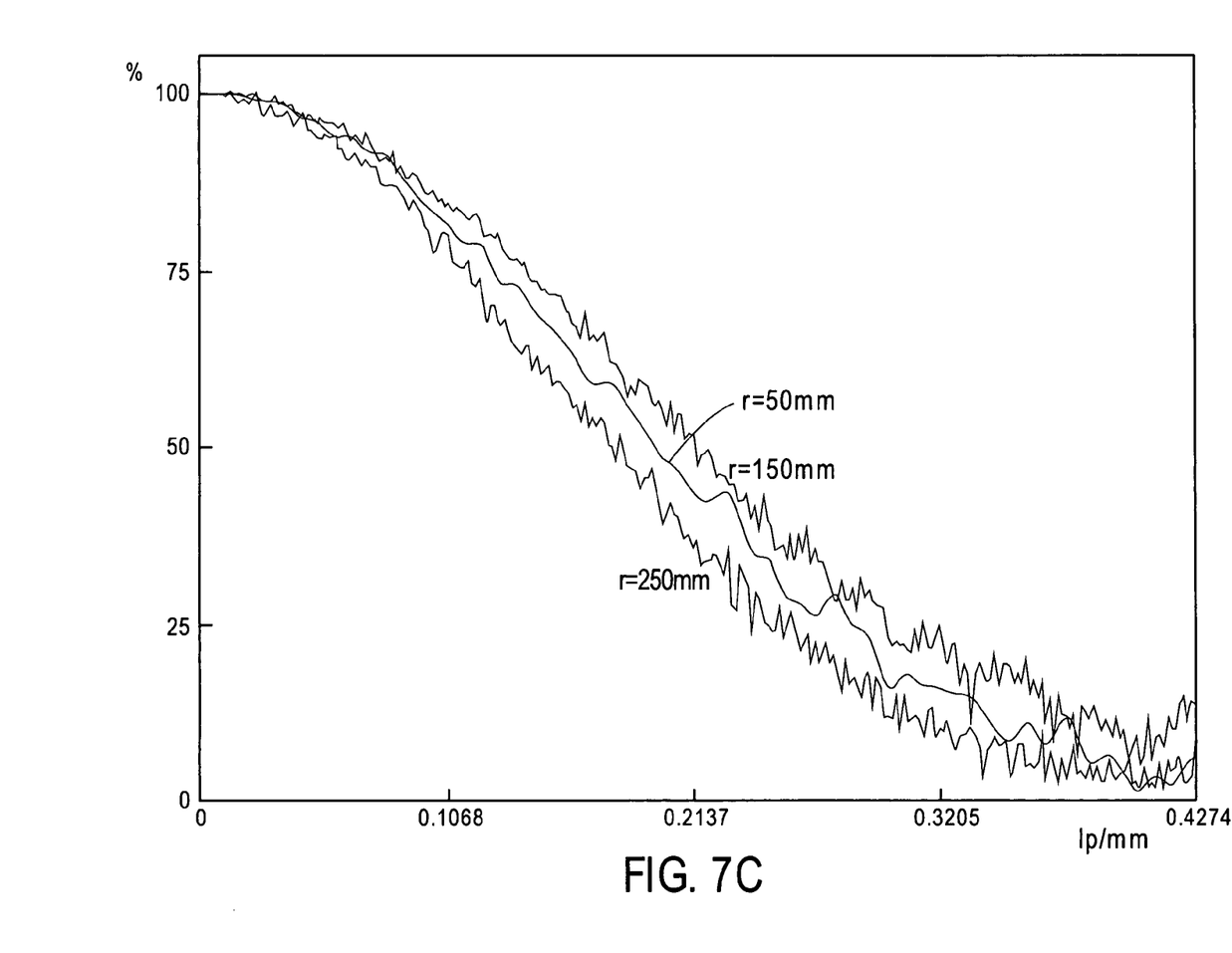
FIG. 7C is a graph illustrating the modulation transfer function of the spatial resolution of the system represented in the Fourier Domain, corresponding to FIG. 6C.

FIGS. 7A, 7B, and 7C illustrate the modulation transfer function (MTF) of the spatial resolution of the system in the Fourier Domain, against line pair per millimeter (1 p/mm). To assist the reader in understanding "line pair per millimeter," the following example of 0.1 lp/mm is provided. 0.1 lp/mm corresponds to 1 lp/10 mm, which corresponds to 1 1/5 mm, which means that an object having a diameter of 5 mm is resolved. Referring to FIG. 7A, such an object having a diameter of 5 mm will be at 0.1 lp/mm on the abcissa. 0.1 lp/mm on the abcissa corresponds to a resolution on the ordinate of 75% at a radius of 50 mm.

Figure 6A:
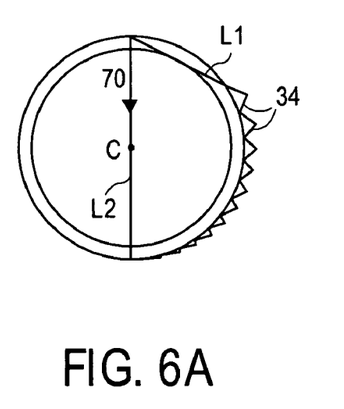
FIG. 6A illustrates the orientation of a target wherein a line normal to the target passes through the center line.

FIGS. 6A and 7A correspond to the situation in FIG. 5, where the line 70 passes through the center axis C. In FIG. 7A, the focal resolutions at different radii, namely 50 mm, 150 mm, and 250 mm from the center axis C are represented. It can be seen that there is a significant degradation in resolution at a radius of 150 mm for an increase of line pair per millimeter.

Figure 6B:
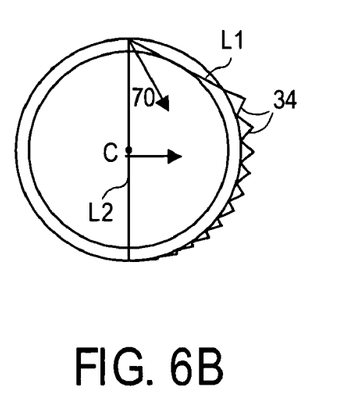
FIG. 6B is a view similar to FIG. 6A, but wherein the target is rotated so that the line passes halfway through an included angle of x-rays.

FIGS. 6B and 7B illustrate the situation where the target 56 within the x-ray source 32 is rotated so that the line 70 divides the included angle A in half. In this situation, it can be seen that the resolution at the outer radii of 150 mm and 250 mm remains relatively good with an increase of line pair per millimeter, but that there is a rapid degradation in the resolution at the inner radius of 50 mm with an increase in line pair per millimeter.

Figure 6C:
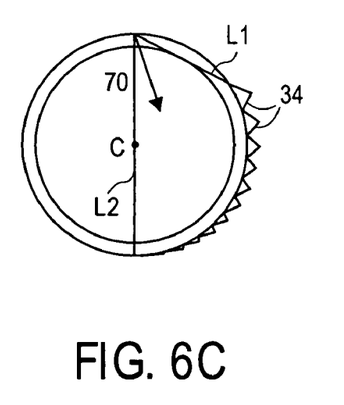
FIG. 6C is a view similar to FIGS. 6A and 6B, wherein the line passes through a point between the line of FIG. 6A and the line of FIG. 6B.

FIGS. 6C and 7C illustrate a compromise, wherein the line 70 passes between a line from the target 56 through the center axis C and a line dividing the included angle A in half. In this situation, there is relatively little degradation in resolution at all three radii, 50 mm, 150 mm, and 250 mm, with an increase in line pair per millimeter.

As previously mentioned, the invention is described by way of example only. In the foregoing description an example is given of apparatus and a method for inspecting closed containers before being loaded into a loading bay of an airplane. Such use may, for example, be for the detection of explosives within closed containers. It should, however, be understood that the invention is not to be limited to the inspection of a closed container before being loaded into a loading bay of an airplane. Various aspects of the invention may, for example, find application in the detection of contraband and illicit materials generally, applications beyond those linked to aviation, such as rail travel, the inspection of mail or parcels, materials testing and characterization, and the inspection of patients, in particular those applications utilizing CT technology.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. An x-ray based non-intrusive inspection apparatus, comprising:
    a support frame;
    an object support secured to the support frame;
    a gantry mounted to the support frame and being rotatable about a center axis (C) relative to an object held by the object support;
    an x-ray source mounted to the gantry and providing x-rays that transmit through the object, the x-rays having an included angle between first and second shadow lines (L1; L2) such that a circle of reconstruction is formed upon rotation of the gantry having a radius (R) from the center axis (C) to a closest point (P1) on the first shadow line, a distance from the center axis (C) to a closest point (P2) on the second shadow line (L2) being less than the radius (R); and
    a plurality of detectors located in a position to detect the x-rays after leaving the object, wherein the detectors are on a curve having a center axis that is not at the x-ray source.

2. The x-ray based non-intrusive inspection apparatus of claim 1, wherein the included angle is less than 75 degrees.

3. The x-ray based non-intrusive inspection apparatus of claim 1, wherein the radius (R) is at least twice the distance.

4. The x-ray based non-intrusive inspection apparatus of claim 1, wherein the distance is approximately 0 cm.

5. The x-ray based non-intrusive inspection apparatus of claim 1, comprising a plurality of x-ray sources mounted at different positions about the center axis.

6. The x-ray based non-intrusive inspection apparatus of claim 1, wherein the objed support is a conveyor belt.

7. The x-ray based non-intrusive inspection apparatus of claim 1, wherein the detectors are on a curve having a center axis at the x-ray source.

8. The x-ray based non-intrusive inspection apparatus of claim 1, wherein the detectors are on a curve having a center axis at the center axis about which the gantry rotates.

9. The x-ray based non-intrusive inspection apparatus of claim 1, wherein the x-ray source includes a vacuum envelope, an electron source providing an electron beam in the vacuum envelope, and a target having a surface on which the electron beam is directed, the surface, when viewed in cross-section in a plane of the center axis, being an angle other than normal to the electron beam so that the x-rays radiate toward the center axis.

10. The x-ray based non-intrusive inspection apparatus of claim 9, wherein, when viewed in cross-section at right angles to the center axis, a line from a center axis of and normal to the surface does not pass through the center axis.

11. The x-ray based non-intrusive inspection apparatus of claim 10, wherein the line is located between a line passing through the center line and a line dividing the included angle in half.

12. An x-ray based non-intrusive inspection apparatus, comprising:
    a support frame;
    an object support secured to the support frame;
    a gantry mounted to the support frame and being rotatable about a center axis (C) relative to an object held by the objed support;
    an x-ray source mounted to the gantry and providing x-rays having an included angle between first and second shadow lines (L1; L2), a point (P1) on the first shadow line (L1) closest to the center axis (C) being farther from the center axis (C) than a point (P2) on the second shadow line (L2) closest to the center axis (C); and
    a plurality of detectors located in a position to detect the x-rays after leaving the object, wherein the detectors are on a curve having a center axis that is not at the x-ray source.

13. A method of non-intrusively inspecting an object, comprising:
    emitting x-rays from an x-ray source through the object;
    rotating the x-ray source about a center axis (C) relative to the object, the x-rays having an included angle between first and second shadow lines (L1; L2) such that a circle of reconstruction is formed upon rotation of the gantry having a radius (R) from the center axis (C) to a closest point (P1) on the first shadow line (L1), a distance from the center axis (C) to a closest point (P2) on the second shadow line (L2) being less than the radius (R); and
    detecting the x-rays after leaving the object with a plurality of detectors located in a position to detect the x-rays after leaving the object, wherein the detectors are on a curve having a center axis that is not at the x-ray source.

14. The method of claim 13, wherein the included angle is less than 75 degrees.

15. The method of claim 13, wherein the radius is at least twice the distance.

16. The method of claim 13, wherein the distance is approximately 0 cm.

17. The method of claim 13, wherein x-rays are emitted from a plurality of x-ray sources that, at a given moment, are located at various angles about the center axis.

18. The method of claim 13, further comprising conveying the object on a conveyor belt.

19. The method of claim 13, wherein the x-ray source rotates relative to a frame and the object does not rotate relative to the frame.

20. A method of non-intrusively inspecting an object, comprising:

emitting x-rays from an x-ray source through the object;
rotating the x-ray source about a center axis (C) relative to the objed, the x-rays having an included angle between first and second shadow lines (L1; L2), a point (P1) on the first shadow line (L1) closest to the center axis (C) being farther from the center axis (C) than a point (P2) on the second shadow line (L2) closest to the center axis (C); and detecting the x-rays after leaving the object with a plurality of detectors located in a position to detect the x-rays after leaving the object, wherein the detectors are on a curve having a center axis that is not at the x-ray source.

* * * * *